(12) United States Patent
Blanc et al.

(10) Patent No.: US 9,790,112 B2
(45) Date of Patent: Oct. 17, 2017

(54) SYSTEMS AND METHODS FOR WASTE TREATMENT

(71) Applicant: AQUANOS ENERGY LTD., Shoshanat HaAmakim (IL)

(72) Inventors: Remy Blanc, Shoresh (IL); Ehud Leshem, Shoshanat HaAmakim (IL)

(73) Assignee: AQUANOS ENERGY LTD., Shoshanat Haamakim (IL)

( * ) Notice: Subject to any disclaimer, the term of this patent is extended or adjusted under 35 U.S.C. 154(b) by 361 days.

(21) Appl. No.: 13/944,263

(22) Filed: Jul. 17, 2013

(65) Prior Publication Data

US 2014/0042085 A1   Feb. 13, 2014

Related U.S. Application Data

(60) Provisional application No. 61/673,532, filed on Jul. 19, 2012.

(51) Int. Cl.

| C02F 3/02 | (2006.01) |
|---|---|
| C02F 3/08 | (2006.01) |
| C02F 3/12 | (2006.01) |
| C02F 3/32 | (2006.01) |
| C02F 3/34 | (2006.01) |
| C02F 3/06 | (2006.01) |

(Continued)

(52) U.S. Cl.
CPC ........... *C02F 3/025* (2013.01); *C02F 3/085* (2013.01); *C02F 3/1257* (2013.01); *C02F 3/325* (2013.01); *C02F 3/341* (2013.01); *C02F 3/06* (2013.01); *C02F 3/104* (2013.01); *C02F 3/223* (2013.01); *C02F 3/226* (2013.01); *C02F 3/30* (2013.01); *C02F 2101/30* (2013.01); *C02F 2305/06* (2013.01); *Y02W 10/15* (2015.05); *Y02W 10/37* (2015.05)

(58) Field of Classification Search
CPC ...... Y02W 10/15; C02F 3/32; C02F 2305/06; C02F 3/322; C02F 2209/22; C02F 3/02
USPC ................................................. 210/194, 620
See application file for complete search history.

(56) References Cited

U.S. PATENT DOCUMENTS

| 3,768,200 A | 10/1973 | Klock |
|---|---|---|
| 3,819,512 A | 6/1974 | Praznovsky et al. |

(Continued)

FOREIGN PATENT DOCUMENTS

| CN | 101560484 A | 10/2009 |
|---|---|---|
| CN | 101853955 A | 10/2010 |

(Continued)

OTHER PUBLICATIONS

González, et al., "Efficient nutrient removal from swine manure in a tubular biofilm photo-bioreactor using algae-bacteria consortia", Water Science & Technology—WST, vol. 58.1, pp. 95-102, (2008).

(Continued)

*Primary Examiner* — Claire Norris
(74) *Attorney, Agent, or Firm* — Dorsey & Whitney LLP

(57) ABSTRACT

Systems and methods for aerobically processing waste, in which an aerobic bioreactor is in selective fluid communication with a source of oxygen-rich liquid medium. The aerobic bioreactor is configured for aerobically processing waste via bacteria fixed on media to provide processed effluent from the waste. The source of oxygen-rich liquid medium is different from the aerobic bioreactor.

19 Claims, 4 Drawing Sheets

(51) Int. Cl.
    *C02F 3/10*         (2006.01)
    *C02F 3/22*         (2006.01)
    *C02F 3/30*         (2006.01)
    *C02F 101/30*     (2006.01)

(56) References Cited

U.S. PATENT DOCUMENTS

| | | | |
|---|---|---|---|
| 3,955,318 A | | 5/1976 | Hulls |
| 4,005,546 A | * | 2/1977 | Oswald ............ C02F 3/32 210/602 |
| 4,209,388 A | | 6/1980 | DeFraites |
| 4,432,869 A | * | 2/1984 | Groeneweg et al. ......... 210/602 |
| 5,032,276 A | | 7/1991 | Mackrle et al. |
| 6,077,424 A | | 6/2000 | Katsukura et al. |
| 6,896,804 B2 | | 5/2005 | Haerther et al. |
| 7,008,535 B1 | * | 3/2006 | Spears ............ B01F 3/0473 210/220 |
| 2003/0209489 A1 | | 11/2003 | Haerther et al. |
| 2010/0018918 A1 | | 1/2010 | Troubounis et al. |
| 2010/0200496 A1 | * | 8/2010 | Graveleau ............ C02F 1/24 210/605 |
| 2010/0288695 A1 | | 11/2010 | Lawrence |
| 2010/0300962 A1 | | 12/2010 | Semenza |
| 2011/0151547 A1 | | 6/2011 | Bloch et al. |

FOREIGN PATENT DOCUMENTS

| | | |
|---|---|---|
| CN | 201801419 U | 4/2011 |
| CN | 102211834 A | 10/2011 |
| FR | 2 344 627 A2 | 10/1977 |
| JP | 58-166989 A | 10/1983 |
| JP | 61-197098 A | 9/1986 |
| JP | 63-252596 A | 10/1988 |
| JP | 3-198727 A | 8/1991 |
| JP | 2008-272721 A | 11/2008 |
| WO | 2011/022754 A1 | 3/2011 |

OTHER PUBLICATIONS

The International Search Report for International Application No. PCT/IL2013/050611, three pages, mailed Oct. 1, 2013.

Muñoz, et al., "Algal-bacterial processes for the treatment of hazardous contaminants: A review", Water Research, vol. 40, pp. 2799-2815, (2006).

* cited by examiner

SYSTEMS AND METHODS FOR WASTE TREATMENT

TECHNOLOGICAL FIELD

The presently disclosed subject matter relates to methods and systems for waste treatment, in particular for liquid waste treatment.

BACKGROUND

The desirability of treating waste particularly in liquid form, also referred to herein interchangeably as wastewater, is well known. Some types of waste treatment are conventionally based on biological oxidation of the organic matter in the waste to carbon dioxide ($CO_2$), using microorganisms such as bacteria. Many such waste treatment processes occur in the presence of oxygen, referred to as aerobic processes.

By way of non-limiting example, U.S. Pat. No. 6,896,804 discloses a system and a method for aerobic treatment of waste, including the continual introduction of microalgae.

Also by way of non-limiting example: U.S. Pat. No. 4,005,546 discloses a method of waste treatment and algae recovery; U.S. Pat. No. 4,209,388 discloses a method for the treatment of sanitary sewage comprising water containing suspended or dissolved organic matter, the concentration of which is measured by biochemical oxygen demand (BOD); U.S. Pat. No. 3,955,318 discloses a method of producing an algae product and of purifying aqueous organic waste material to provide clean water.

GENERAL DESCRIPTION

According to a first aspect of the presently disclosed subject matter, there is provided a system for aerobically processing waste, in particular liquid waste, for example waste water, comprising:
  an aerobic bioreactor configured for aerobically processing the waste via bacteria fixed on media to provide processed effluent from the waste;
  a source of oxygen-rich liquid medium, said source being different from and/or separate from said aerobic bioreactor, said source being in selective fluid communication with said aerobic bioreactor.

The system can comprise a recirculation circuit configured for controllably recirculating said liquid medium between said aerobic bioreactor and said source.

Additionally or alternatively, said system is configured for preventing the media from being transferred from the aerobic bioreactor to said source.

Additionally or alternatively, said media is restricted to a confined volume within said aerobic bioreactor.

Additionally or alternatively, in operation of the system a flow of said oxygen-rich liquid medium is forced through (i.e., into and out of) said confined volume wherein to interact with said bacteria.

According to a second aspect of the presently disclosed subject matter, there is provided a system for aerobically processing waste, comprising:
  an aerobic bioreactor configured for aerobically processing waste to provide processed effluent from the waste;
  a source of oxygen-rich liquid medium, said source being different from and/or separate from the bioreactor,
  a recirculation circuit configured for controllably recirculating said liquid medium between said aerobic bioreactor and said source.

The aerobic bioreactor can be configured for aerobically processing waste via bacteria fixed on media, and optionally said system can be configured for preventing the media from being transferred from the aerobic bioreactor to the source. Additionally or alternatively, said media is restricted to a confined volume within said aerobic bioreactor. In operation of the system a flow of said oxygen-rich liquid medium is forced through (i.e., into and out of) said confined volume wherein to interact with said bacteria.

According to a third aspect of the presently disclosed subject matter, there is provided a system for aerobically processing waste, comprising:
  bacteria for aerobically processing waste to provide processed effluent from the waste, said bacteria being fixed on media restricted to a confined volume;
  a flow of oxygen-rich liquid medium forced through (i.e., into and out of) said confined volume wherein to interact with said bacteria.

Said confined volume is provided in an aerobic bioreactor, and a source of oxygen-rich liquid medium provides said flow of oxygen-rich medium, said source being different from and/or separate from the aerobic bioreactor.

Additionally or alternatively, said system is configured for preventing the media from being transferred from the aerobic bioreactor to the source.

Additionally or alternatively, the system comprises a recirculation circuit configured for controllably recirculating said liquid medium between said aerobic bioreactor and said source.

In the system according to any one of the aforementioned first, second and third aspects of the presently disclosed subject matter, said source comprises photosynthetic microorganisms that generate oxygen to said liquid medium responsive to exposure to light.

Additionally or alternatively, said source comprises any one of photosynthetic eukaryotic microorganisms and photosynthetic prokaryotic microorganisms that generate oxygen to said liquid medium responsive to exposure to light.

Additionally or alternatively, said source comprises algae that generate oxygen to said liquid medium responsive to exposure to light.

For example, said photosynthetic microorganisms comprise at least one of: *Chlorella* spp, spirulina, scendesmus, cyanobacteria.

Additionally or alternatively, said source comprises a reservoir comprising a channel therein defining a reservoir internal volume, and configured for driving said liquid medium around said channel in operation of the system.

Additionally or alternatively, the system according to any one of the aforementioned first, second and third aspects of the presently disclosed subject matter, further comprises an auxiliary aeration system, configured for selectively providing gaseous oxygen or air to said bioreactor.

Additionally or alternatively, the system according to any one of the aforementioned first, second and third aspects of the presently disclosed subject matter, further comprises an auxiliary $CO_2$ system, configured for selectively providing carbon dioxide to said source.

Additionally or alternatively, said media is fixed in situ within the bioreactor, for example in the form of fixed media. For example the media comprises a substrate that is fixed on one or more sides thereof to the structure of the aerobic bioreactor. For example, such fixed media can be in the form of a plastic matrix attached to the floor or sides of the aerobic bioreactor and/or ropes or fibers hanging within the liquid in the aerobic bioreactor and attached either to the walls or other structure of the aerobic bioreactor or attached to a rigid frame located within the aerobic bioreactor.

Additionally or alternatively, said media is mobile, i.e., free-floating within the bioreactor.

Additionally or alternatively, said media comprise biofilm carrier elements, in the form of solid inert substrates having a relatively large surface area to volume ratio. Such substrates can include, for example, any one of polyethylene or other plastics, and the respective surface area to volume ratio can be, for example, between about 500 $m^2/m^3$ and about 1300 $m^2/m^3$, for example about 650 $m^2/m^3$. Alternatively, substrates can include, for example, any one of metallic materials, fibers, cloths, mineral materials (such as for example carbon, volcanic tuff, gravel), and so on, at least some of which can have respective surface area to volume ratios much higher than 1300 $m^2/m^3$.

Additionally or alternatively, the system according to any one of the aforementioned first, second and third aspects of the presently disclosed subject matter, further comprises a waste inlet configured for receiving the waste and a dispensing outlet for dispensing treated effluent, and wherein
said bioreactor comprises at least one vessel defining a respective aerobic processing volume, the at least one vessel comprising a bioreactor fluid medium inlet and a bioreactor fluid medium outlet, each in selective fluid communication with said source, the at least one vessel being configured for ensuring that the respective aerobic processing volume is partially or fully shielded from light at least during operation of the system;
said source comprises at least one reservoir defining a respective reservoir volume for accommodating a volume of said liquid medium, and further comprising a source fluid medium inlet and a source fluid medium outlet, each in selective fluid communication with said aerobic bioreactor, and a driving device for providing motion to said liquid medium within said respective reservoir volume, the at least one reservoir being configured for ensuring that the respective reservoir volume is exposed to light at least during operation of said source wherein to provide said oxygen-rich liquid medium.

For example, said driving device comprises a powered paddling device mounted to the respective said reservoir. Additionally or alternatively, said at least one reservoir comprises at least one flow channel in the form of a horizontal endless loop. For example, said at least one flow channel has an annular plan form. For example, said at least one flow channel has a raceway configuration. Additionally or alternatively, said source fluid medium outlet is configured for preventing outflow of said media therethrough.

Additionally or alternatively, the system according to any one of the aforementioned first, second and third aspects of the presently disclosed subject matter, further comprises:
at least one set of conduits providing said fluid communication between said at least one said vessel and a respective said reservoir;
a pumping system, different from said driving device, for providing recirculation of said medium between said at least one vessel and the respective said reservoir through said set of conduits.

For example, one said conduit connects said source fluid medium inlet with said bioreactor fluid medium outlet and wherein another said conduit connects said source fluid medium outlet with said bioreactor fluid medium inlet.

According to a fourth aspect of the presently disclosed subject matter, there is provided a method for aerobically processing waste, comprising:
aerobically reacting waste in an aerobic bioreactor via bacteria fixed on media;
providing oxygen-rich liquid medium to the bioreactor from an oxygen-rich liquid source, wherein the oxygen-rich liquid source is different from and/or separate from the bioreactor.

According to a fifth aspect of the presently disclosed subject matter, there is provided a method for aerobically processing waste, comprising:
aerobically processing waste in an aerobic bioreactor to provide processed effluent from the waste;
providing oxygen-rich liquid medium to the bioreactor from an oxygen-rich liquid source, wherein the oxygen-rich liquid source is different from and/or separate from the bioreactor,
controllably recirculating said liquid medium between said aerobic bioreactor and said source.

According to a sixth aspect of the presently disclosed subject matter, there is provided a method for aerobically processing waste, comprising:
aerobically processing waste with bacteria to provide processed effluent from the waste, said bacteria being fixed on media restricted to a confined volume;
forcing a flow of oxygen-rich liquid medium through (i.e., into and out of) said confined volume wherein to interact with said bacteria.

In the method according to any one of the aforementioned fourth, fifth, and sixth aspects of the presently disclosed subject matter, said liquid medium comprises photosynthetic microorganisms that generate and provide oxygen to said liquid medium responsive to exposure to light.

According to a seventh aspect of the presently disclosed subject matter, there is provided a method for aerobically processing waste, comprising:
reacting waste aerobically with bacteria in a bioreactor volume under conditions configured for inhibiting or reducing growth of photosynthetic microorganisms;
providing a flow of oxygen-producing photosynthetic microorganisms through the bioreactor volume from a source configured for promoting oxygen production by photosynthetic microorganisms, the source being different from and/or separate from the bioreactor volume, the photosynthetic microorganisms generating and providing oxygen to said liquid medium responsive to exposure to light; and
preventing at least a majority of the bacteria from exiting the bioreactor with said flow of photosynthetic microorganisms.

In the method according to any one of the aforementioned fourth, fifth, sixth and seventh aspects of the presently disclosed subject matter, said photosynthetic microorganisms comprise any one of photosynthetic eukaryotic microorganisms and photosynthetic prokaryotic microorganisms that generate oxygen to said liquid medium responsive to exposure to light. Additionally or alternatively, said source comprises algae that generate oxygen to said liquid medium responsive to exposure to light. Additionally or alternatively, said photosynthetic microorganisms comprise at least one of: *Chlorella* spp, spirulina, scendesmus, cyanobacteria.

In the system according to any one of the aforementioned first, second and third aspects of the presently disclosed subject matter, and/or in the method according to any one of the aforementioned fourth, fifth, sixth and seventh aspects of the presently disclosed subject matter, the waste is aerobically treatable for removing pollutants therefrom. For example, said waste is a liquid waste. For example, said waste comprises waste water. For example, said waste includes organic types of waste. For example, said waste comprises at least one of animal, agricultural, industrial or human waste transported in water or another liquid medium.

A feature of at least some examples of the presently disclosed subject matter is that the energy requirement to generate and supply oxygen to the aerobic bioreactor is much less than would be the case if the oxygen is instead provided by an aerator or the like.

A feature of at least some examples of the presently disclosed subject matter is that, by separating the aerobic treatment process of waste from the process of generating oxygen via photosynthetic microorganisms (for example algae), interference between the two processes can be minimized or avoided.

A feature of at least some examples of the presently disclosed subject matter is that, by separating the aerobic treatment process of waste from the process of generating oxygen via photosynthetic microorganisms (for example algae), each process can be separately and independently optimized.

A feature of at least some examples of the presently disclosed subject matter is that, by providing bacteria fixed on media, the aerobic treatment process of waste can be easily separated from the process of generating oxygen via photosynthetic microorganisms (for example algae).

A feature of at least some examples of the presently disclosed subject matter is that, by providing bacteria fixed on media, the efficiency of the aerobic treatment of waste can be enhanced as compared with providing the bacteria without media.

BRIEF DESCRIPTION OF THE DRAWINGS

In order to understand the disclosure and to see how it may be carried out in practice, examples will now be described, by way of non-limiting example only, with reference to the accompanying drawings, in which.

DETAILED DESCRIPTION

Figure 1A:
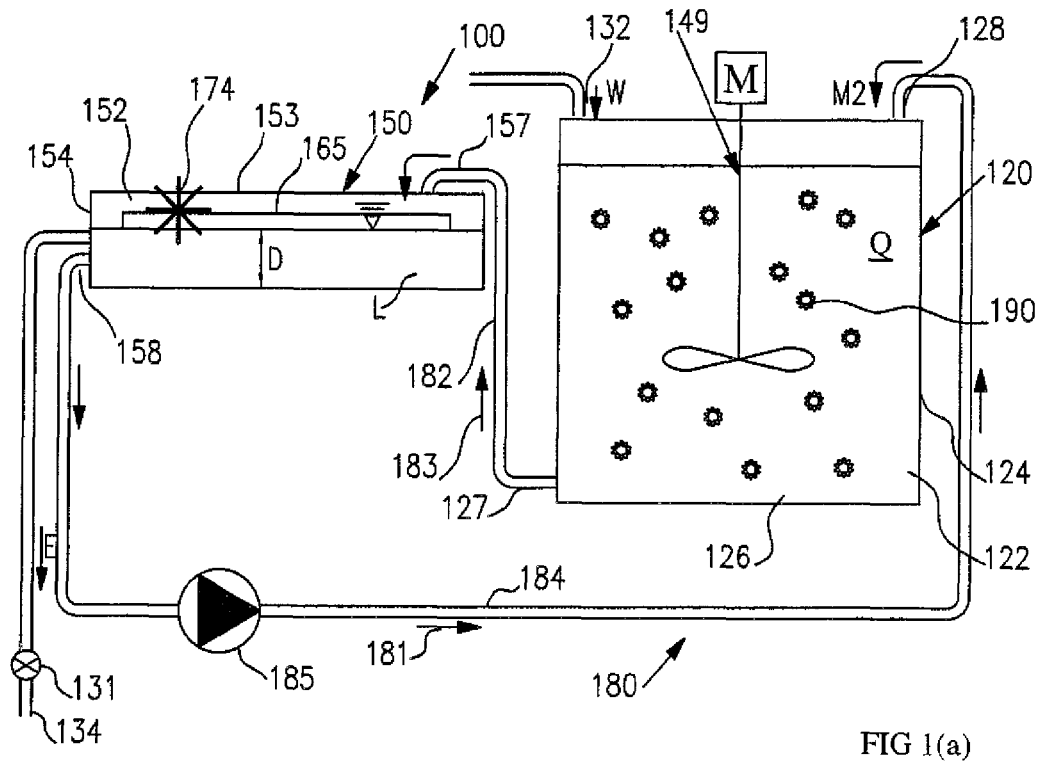
FIG. 1(a) and FIG. 1(b) are respectively a cross-sectional side view and a plan view of a system for aerobic processing of waste according to a first example of the presently disclosed subject matter.
Figure 1B:
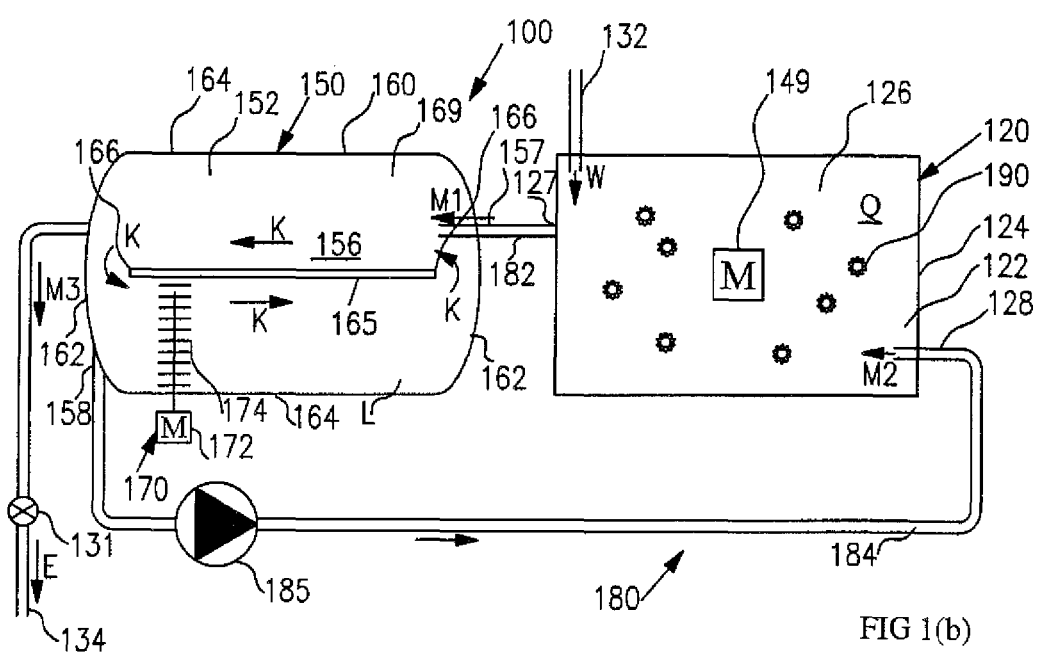

Referring to FIGS. 1(a) and 1(b), a system for aerobic processing of waste, in particular liquid waste, according to a first example of the presently disclosed subject matter, generally designated 100, comprises an aerobic bioreactor 120 and an oxygen-rich liquid medium source 150.

Such waste includes but is not limited to organic types of waste, in particular waste water containing suspended or dissolved organic matter as well as nitrogenous components, for example animal, agricultural, industrial or human waste transported in water, and which can be aerobically treated to remove pollutants.

Aerobic bioreactor 120 comprises a vessel 122 and is configured for aerobically processing waste therein using suitable microorganisms and oxygen, the oxygen being provided via a supply of oxygen-rich liquid medium L that is controllably recirculated between the liquid medium source 150 and the aerobic bioreactor 120.

Vessel 122 comprises walls 124 and defines an internal volume 126 (of magnitude V1), the respective aerobic processing volume. The vessel 122 can have any desired or suitable shape, for example cylindrical, frusto-conical, parallelepiped, and so on, and is configured for preventing the internal volume 126 from being irradiated by electromagnetic radiation having wavelengths corresponding to at least a predetermined group and/or range of wavelengths. This predetermined group and/or range of wavelengths consists of electromagnetic wavelengths that promote growth of algae and the accompanying generation of oxygen by the algae. This predetermined group and/or range of wavelengths is referred to herein as "light", and typically includes the visible light spectrum and other wavelengths associated with photosynthesis. Thus, for example, the vessel 122 can be free-standing and the walls 124 are opaque to light. Alternatively, the vessel 122 can have translucent or transparent (or indeed opaque) walls, but in use the vessel 122 is buried underground, or is kept in a darkened enclosure, or is covered with an opaque shield, opaque blanket, or other opaque covering.

Such shielding of the internal volume 126 from said light can be full shielding, i.e., fully 100% effective in preventing the internal volume 126 from being irradiated by said light. Alternatively, such shielding of the internal volume 126 from said light can be partial shielding, i.e., can be less than 100% effective, for example up to 60%, or 70% or 80% or 90% or 95% or 98% or 99%, or any other percentage value inbetween these examples. In alternative variations of this example, the internal volume 126 has zero shielding from said light.

The liquid medium source 150 comprises reservoir 152 (also referred to herein interchangeably as a tank) and is configured for providing a supply of liquid medium L that is controllably recirculated between the reservoir 152 and the aerobic bioreactor 120.

The reservoir 152 is different from and/or separate from the aerobic bioreactor 120, comprises walls 154 which define an internal volume 156 (of magnitude V2), the respective reservoir algae growth volume. The internal volume 156 is different from and separate from the internal volume 126 of the aerobic bioreactor 120. The reservoir 152 can have any desired or suitable shape that is configured for allowing circulation of the liquid medium therein. In this example, the reservoir 152 has a classical "raceway" configuration, comprising a generally elongated rectangular planform 160 having generally rectilinear upstanding longitudinal walls 164 and rounded ends 162 at the longitudinal ends thereof. A dividing wall 165 is positioned between longitudinal walls 164 and laterally spaced therefrom, extending longitudinally from the center of planform 160 towards rounded ends 162, but leaving a spacing between each edge 166 of the dividing wall 165 and the respective end 162. An endless, oval-shaped horizontal channel 169 is thus defined in the reservoir 152, allowing endless flow of the liquid medium L around the channel 169, driven by driver 170. In this example, the driver 170 is a mechanical propulsion device, and comprises a powered paddling system, including a motor 172 operatively connected to a paddle wheel 174, which comprises a plurality of paddles radially radiating from an axle that is rotatably mounted to the reservoir 152. In operation, the paddle wheel 174 is partially submerged in the liquid medium L and is turned by the motor 172 thereby propelling the liquid medium L around the channel 169 continuously in an endless loop (see arrows K). In alternative variations of this example, other arrangements can be provided for mixing the algae in the reservoir 152, for example: a moving bridge device, a cable pulled device, and so on.

The reservoir 152 is configured for allowing the internal volume 156 to be irradiated by said light, i.e. by electromagnetic radiation having wavelengths at least in the aforesaid predetermined group and/or range of wavelengths. In this example, the reservoir 152 has an open top 153, and thus the channel 169 can have a U-shaped or V-shaped transverse cross-section, for example, allowing natural sunlight to reach the liquid medium L in the channel 169 up to a particular penetration depth. In this example, the channel 169 is configured having an operational depth D of liquid medium L similar to the aforesaid penetration depth, but in alternative variations of this example the channel 169 can be instead configured having operational depth D of liquid medium L greater than or less than the aforesaid penetration depth. The depth of the channel 169 can be uniform across the cross-section of the channel 169, or can vary therein. For example, depth D can vary across the width of the channel from 30 cm at the longitudinal walls 164 to more than 1 meter at the center of the channel 169, or, the entire width of the channel 169 can be about 60 cm deep, or, the depth at the longitudinal walls 164 can be greater than 60 cm and the center of the channel 169 the depth can be greater than 2 meters deep. Optionally, the top 153 can be covered with a translucent or transparent cover, allowing said light to penetrate, but preventing contaminants from entering, the internal volume 156.

In this example the reservoir 152 is configured for operation in an outdoors environment. However, in alternative variations of this example the reservoir 152 can be configured for operation in an indoors environment, for example a greenhouse-type structure wherein such light may be provided via glass panels, or for example other natural or artificial structures in which such light is provided artificially via suitable illuminating apparatus such as electrical lamps, for example. Thus, the system 100 can optionally comprise illuminating apparatus such as lamps, for continual use, or for periodic use, for example during nighttime or low sunlight/overcast conditions.

System 100 comprises a recirculation circuit 180, having a reservoir outward flow path 181 and a reservoir return flow path 183 for recirculating the liquid medium L between the aerobic bioreactor 120 and the reservoir 150, in particular between the internal volume 126 and the internal volume 156. The reservoir outward flow path is provided by conduit 184, which provides fluid communication, in particular liquid communication, between bioreactor inlet 128 and reservoir outlet 158. The reservoir return flow path is provided by conduit 182, which thus provides fluid communication, in particular liquid communication, between bioreactor outlet 127 and reservoir inlet 157.

In this example, the recirculation circuit 180 further comprises a pump 185 for driving the aforesaid recirculation of the liquid medium L between the aerobic bioreactor 120 and the reservoir 150. For example, such a pump 185 can be a submersible pump, for example: XFP-8c-201g provided by ABS of Malmo, Sweden; or pump D-3000 provided by Flygt, of Stockholm, Sweden; or a dry mounted external pump, for example FR provided by ABS of Malmo, Sweden; or pump N-3000 provided by Flygt, of Stockholm, Sweden; or pump DWK, provided by Grundfoss of Bjerringbo, Denmark.

Optionally, part of the pumping may be carried out via gravity, and thus pump 185 can optionally comprise a gravity pump system. For example, flow of liquid medium L along the reservoir outward flow path 181 is via gravity, while a powered pump forces the flow of liquid medium L through the reservoir return flow path 183, or, flow of liquid medium L along the reservoir return flow path 183 is via gravity, while a powered pump forces the flow of liquid medium L through the reservoir outward flow path 181.

The liquid medium source 150, in particular the reservoir 152, is configured for generating and providing oxygen to liquid medium L, so that the oxygen-rich liquid medium L can be provided to the aerobic bioreactor 120 (via conduit 184). The generation of oxygen is accomplished by the photosynthetic action of photosynthetic microorganisms, in particular photosynthetic eukaryotic or prokaryotic microorganisms for example algae, (that are carried in the liquid medium L), when illuminated by said light and provided with appropriate nutrients. In this example, in which the reservoir 152 has an open top 153, carbon in the form of $CO_2$ is provided from the atmosphere by natural diffusion via the surface of the liquid medium L, and nutrients required for the biological process are provided from the incoming waste water.

Such photosynthetic microorganisms can include any suitable photosynthetic eukaryotic microorganisms or photosynthetic prokaryotic microorganisms. For example, suitable photosynthetic eukaryotic microorganisms include algae, for example any one of the following: *Chlorella*, *Scenedesmus*, *Spirulina*, diatoms, and so on. In addition, suitable photosynthetic prokaryotic microorganisms include cyanobacteria (also known as "blue-green algae") that can also serve as a photosynthetic source of oxygen.

Thus, while the disclosure herein refers algae per se, it is to be noted that the disclosure applies, mutatis mutandis, to any other photosynthetic eukaryotic or prokaryotic microorganisms, for example as listed above.

The algae are thoroughly mixed within liquid medium L and are continually or cyclically exposed to the illuminating light by the motion around the channel 169 provided by driver 170, and the oxygen produced by the algae is dissolved in the liquid medium L.

The system 100 further comprises a waste inlet 132 (optionally including a valve, not shown) at the aerobic bioreactor 120 for receiving waste into the internal volume 126 and that is to be treated aerobically by the system 100. The system also comprises a treated effluent outlet 134 with valve 131, for dispensing treated effluent that results from aerobically treating the waste that is supplied to the aerobic bioreactor 120. While in this example, the effluent outlet 134 is provided at the reservoir 152, in alternative variations of this example the effluent outlet 134 can instead be provided at the aerobic bioreactor 120.

In the illustrated example of FIGS. 1(a) and 1(b), the aerobic bioreactor 120 and oxygen-rich liquid medium source 150 are shown in side-by-side configuration in system 100. However, in alternative variations of this example the aerobic bioreactor 120 and oxygen-rich liquid medium source 150 can have any suitable relative spatial relationship: for example, the aerobic bioreactor 120 can be positioned beneath the oxygen-rich liquid medium source 150.

As already mentioned, the aerobic bioreactor 120 is configured for aerobically processing waste using suitable microorganisms and oxygen provided by oxygen-rich liquid medium L. Such microorganisms can include for example any one of the following: saprophytic bacteria, heterotrophic bacteria, autotrophic bacteria, protozoa, metazoa, rotifers, and others.

In particular, the microorganisms are fixed on media 190. Such media 190 comprise biofilm carrier elements, in the form of substrates, in particular solid inert substrates, having a relatively large surface area to volume ratio R. Such substrates can include, for example, any one of polyethylene or other plastics, and the respective surface area to volume ratio R can be, for example, between about 500 $m^2/m^3$ and about 1300 $m^2/m^3$, for example about 650 $m^2/m^3$. Alternatively, substrates can include, for example, any one of metallic materials, fibers, cloths, mineral materials (such as for example carbon, volcanic tuff, gravel), and so on, at least some of which can have respective surface area to volume ratios R much higher than 1300 $m^2/m^3$.

These substrates thus enable large amounts of microorganisms to be fixed on the surface of the substrates as a biofilm, provide a stable matrix for the microorganisms, support aerobic, facultative or anaerobic consortia of microorganisms, and allow optimal interaction between the microorganisms and the waste, which the microorganisms digest aerobically utilizing the dissolved oxygen provided by the liquid medium L.

In this example, the media 190 are mobile, i.e. free-floating media, configured for moving within the liquid environment Q in the internal volume 126, the liquid environment Q including liquid medium L, waste W, and processed effluent E in varying proportions during operation of the system 100.

In this example, the free-floating media 190 are prevented from leaving the aerobic bioreactor 120 and from being transported via recirculation circuit 180 to the reservoir 152, at least during operation of the system 100. For this purpose the aerobic bioreactor 120 comprises suitable mechanical filters, screens or other selective barriers (not shown) at the bioreactor outlet 127, and optionally also at the bioreactor inlet 128, that prevent passage of the media 190 therethrough, while allowing flow of the liquid medium L therethrough.

Examples of such media 190 include one or more of the following: Aqwise Biomass Carriers (ABC 5), provided by Aqwise, Israel; biocarriers K1 or K3, provided by Veolia, France, ActivCell provided by Degremont, France.

In alternative variations of this example, media 190 is, or also additionally comprises, fixed media. Such fixed media are affixed in situ with respect to the location thereof within the internal volume 126, and thus are prevented from leaving the aerobic bioreactor 120 and from being transported via recirculation circuit 180 to the reservoir 152, even in the absence of mechanical filters or screens at the bioreactor outlet 127 and/or at the bioreactor inlet 128. Such fixed media includes types of media in which the substrate is fixed on one or more sides thereof to the structure of the vessel 122. For example, such fixed media can be in the form of a plastic matrix attached to the floor or sides of the vessel 122, and/or ropes or fibers hanging within the liquid in the vessel 122 and attached either to the walls or other structure of the vessel 122 or attached to a rigid frame located within the vessel 122. Examples of such fixed media can include one or more of the following: AccuFAS PVC carrier material, provided by Brentwood Corporation, USA; Bioclere media material provided by Aquapoint, USA; Ringlace biomaedia provided by Ringlace Products, USA.

Alternatively, the fixed media is not necessarily actually attached to the inside of the aerobic bioreactor, but rather comprises a quantity of media which by virtue of its own weight (e.g., a pile of gravel media) remains in a single location in the aerobic bioreactor.

In this example, the aerobic bioreactor 120 further comprises a mixing device 149, configured for mixing the media 190 within the liquid environment Q, while minimizing or preventing damage to the media 190. In this example, the mixing device comprises a powered stirrer, for example for example submersible mixers POPR-I provided by Landia, of Sweden, or mixer RW-400 provided by ABS of Sweden, or mixer 4850 top entry mixer provided by Flygt, of Sweden.

Optionally, the system 100 can further comprise an auxiliary aeration system, (not shown) configured for selectively providing gaseous oxygen or air to the aerobic bioreactor 120, for example comprising a pump or source of compressed air having an outlet in selective communication with the internal volume 126. Such an auxiliary aeration system can be used, for example, during operation of system 100 at nighttime or in low sunlight/overcast conditions, or whenever oxygen production by the source 150 is lower than required, or indeed whenever desired.

Optionally, the system 100 can further comprise an auxiliary $CO_2$ system, (not shown) configured for selectively providing gaseous carbon dioxide or carbon-dioxide rich air to the liquid source 150, for example comprising a pump or source of compressed gaseous carbon dioxide or carbon-dioxide rich air having an outlet in selective communication with the internal volume 156. Such an auxiliary $CO_2$ system can be used, for example, whenever additional $CO_2$ is required for oxygen production by the source 150, or indeed whenever desired.

Operation of system 100 in a continuous flow mode (CFM) can be as follows.

Waste W, mainly in liquid form, is conveyed to the aerobic bioreactor 120 at a flow rate T1 via waste inlet 132, the waste W first having first been subjected to preprocessing, including a screening and degritting process to remove solids, with or without a preliminary anaerobic treatment process. Concurrently, there is provided a recirculating flow of liquid medium L between the reservoir 152 and the aerobic bioreactor 120 via recirculation circuit 180, at a flow rate T2. The liquid medium L also carries algae to and from the reservoir 152 via recirculation circuit 180. The liquid medium L in reservoir 152 is being continuously provided with oxygen generated by the algae therein as the liquid medium L is exposed to said light and provided with nutrients, and this oxygen generation process is enhanced by forcing the liquid medium L to flow along channel 169 by the action of the driver 170. Thus, the liquid medium L delivered to the aerobic bioreactor 120 via conduit 184 is oxygen-rich.

The microorganisms fixed in media 190 treat the waste aerobically, using oxygen dissolved in the liquid medium L delivered from the reservoir 152, thereby converting the waste W into processed effluent E. The effluent E leaves the aerobic bioreactor 120 via conduit 182 under the action of pump 185, and flows into the reservoir 152, to be dispensed via dispensing outlet 134 at flow rate T3.

In practice, a mixture M1 of the processed effluent E, (partially de-oxygenized) liquid medium L, and possibly waste W, in varying proportions, leaves the aerobic bioreactor 120 via conduit 182. Similarly, a mixture M2 of the processed effluent E, (oxygen-rich) liquid medium L, and possibly waste W, in varying proportions, circulates back and enters the aerobic bioreactor 120 via conduit 184. Similarly, a mixture M3 of the processed effluent E, liquid medium L, and possibly waste W, in varying proportions, is dispensed via the dispensing outlet 134. However, the system 100 is also set up such that in steady-state operating conditions, mixture M1 has a high proportion of effluent E relative to waste W, mixture M2 has a high proportion of liquid medium L relative to waste W or effluent E, and mixture M3 has a high proportion of effluent E relative to waste W.

This effect can be achieved as follows, for example. In steady state conditions, the waste input flow rate T1 is about the same as effluent output flow rate T3, and the liquid medium L flow rate recirculating between the reservoir 152 and the aerobic bioreactor 120 T2 is greater than flow rate T1 or T3; for example T2 can be from 2 to 10 times greater than T1 or T3. At the same time, the flow rates T1, T2, T3 are such (when compared with the sizes V1 and V2, respectively, of internal volumes 126 and 156) so as to allow the waste W sufficient residence time (also referred to interchangeably herein as retention time) in the aerobic bioreactor 120 to become processed by the microorganisms in the media 190, and so as to allow the algae sufficient residence time in the reservoir 152 to generate the required levels of oxygen therein.

For example, the volume ratio V2/V1 of the respective internal volumes 126 and 156 can be between about 1 to about 10, or greater; additionally or alternatively, the retention time ratio V1/T1 or V1/T3 can be between about 5 hours to about 20 hours or greater, for example 8 hours; additionally or alternatively, the retention time ratio V1/T2 can be between about 1.0 hours to about 20 hours or greater, for example 2.7 hours; additionally or alternatively, the retention time ratio V2/T1 or V2/T3 can be between about 10 hours to about 40 hours or greater, for example 24 hours; additionally or alternatively, the retention time ratio V2/T2 can be between about 3 hours to about 20 hours or greater, for example 8 hours.

For example, the internal volume 126 can be configured for providing a retention time for the waste therein of between 2 to 12 hours, for a given flow rate T1 of waste W into the aerobic bioreactor 120. For example, the internal volume 156 can be configured for providing a retention time for the liquid medium L including algae therein of between 8 to 72 hours, for a given flow rate T2 of liquid medium L into (and out of) the aerobic bioreactor 120 via recirculation circuit 180.

For example, to provide this effect, the internal volume 126 can be about 400 liters, waste flow rate T1 into the aerobic bioreactor 120 can be about 50 liters/hour, the internal volume 156 can be about 1200 liters, the liquid medium flow rate T2 into the aerobic bioreactor 120 can be about 150 liters/hour, and the processed effluent flow rate T3 out of the system 100 can be about 50 liters/hour. In another example this effect can be provided with the following parameters: the internal volume 126 can be about 400 cubic meters, waste flow rate T1 into the aerobic bioreactor 120 can be about 50 m$^3$/hour, the internal volume 156 can be about 1200 cubic meters, the liquid medium flow rate T2 into the aerobic bioreactor 120 can be about 350 m$^3$/hour, and the processed effluent flow rate T3 out of the system 100 can be about 50 m$^3$/hour. Of course, other examples of the magnitude of the flow rates T1, T2, T3 and of the magnitudes V1, V2, respectively of the internal volume 126 and the internal volume 156, can be chosen to provide the aforementioned effect.

Thus, in operation of the system 100, the microorganisms aerobically treat the waste W in internal volume 126 and in the absence of said light, i.e., in darkened conditions, which are optimal for the microorganisms, while being provided with ample oxygen dissolved in the liquid medium L. In the darkened conditions provided by the aerobic bioreactor 120, the algae that is recirculating through the aerobic bioreactor 120 are thus under conditions that do not promote further growth, and thus minimize interference with the aerobic processing of the waste by the microorganisms. Furthermore, the provision of the microorganism as a biofilm fixed on media 190, in which the microorganism are exposed to the waste W and oxygen-rich liquid medium L over a large surface area relative to the volume occupied by the media 190, enables the waste W to be processed faster and more efficiently than would be the case if the microorganism were instead provided as a sludge moving throughout the system, for example.

On the other hand, the conditions for generating oxygen by the algae in source 150 are also concurrently optimal, the algae receiving said light and nutrients in the reservoir 152, and kept in motion around the channel 169 by the action of the driver 170. Further, these conditions are further optimized by the relative absence of the microorganisms in the reservoir 152, since the microorganisms, being fixed on the media 190, are prevented from being transported to the reservoir 152 from the aerobic bioreactor 120.

Thus, the aerobic treatment process of waste is independent and separated from the process of generating oxygen via algae, avoiding or minimizing interference between the two processes, and each process can be separately and independently optimized.

For a given requirement of throughput of waste through the aerobic bioreactor 120, the reservoir 152 can be sized accordingly whereby to provide the necessary oxygen demand for the bioreactor 120.

The energy requirements for operating the system 100 are thus relatively modest, including the power required for operating the pumps 185, 149, and the driver 170.

The system 100 can optionally further comprise post-processing systems for post-processing the effluent E. For example, downstream of effluent outlet 134 can be provided further filters and purifiers to further purify the effluent E. For example, a plurality of systems 100 can be connected in series, with the first one receiving waste W, and having its effluent outlet 134 connected to the waste inlet 132 of the next system 100 (thus the effluent from the first system is considered as the "waste" being supplied to the next system), which is similarly connected to the next system, and so on, the last system 100 then dispensing the many-times processed effluent E.

It is to be noted that the aerobic processing of the waste in the aerobic bioreactor 120 generates $CO_2$ as a byproduct, and this $CO_2$ can be routed to the reservoir 152 (via suitable piping or the existing liquid flows, for example) to provide additional carbon to the algae therein. Alternatively, the biogas itself, which is rich in $CO_2$, can be used to enrich the algae with a carbon source by injecting it through the liquid medium L.

It is also to be noted that in the aforementioned preprocessing in the form of said anaerobic treatment process, biogas can be generated. This biogas can be sold off, or can be utilized for power generation, for example for powering the system 100, and the $CO_2$ produced as a byproduct of said power generation can also be routed to the reservoir 152 via suitable piping for example to provide additional nutrients to the algae therein.

Alternatively, system 100 can be operated in batch mode (BM), for example as follows. Waste W (after the aforesaid preprocessing) is provided to the aerobic bioreactor 120 until it reaches a particular level. The waste input is turned off at waste inlet 128, and the effluent outlet 134 is also closed. The reservoir is operated as in CFM above, mutatis mutandis, to provide a flow rate of liquid medium L through aerobic bioreactor 120, providing oxygen to the aerobic bioreactor 120, and allowing the aerobic bioreactor 120 and the reservoir to each operate under its own optimal conditions, but without continuous addition of waste W or dispensing of effluent E. The microorganisms that are fixed on media 190 aerobically process the waste in a similar to that of the CFM disclosed above, mutatis mutandis, typically by digesting or decomposing the waste, and when all or most of the waste is processed, the processed effluent can be drained from the aerobic bioreactor 120 or via the reservoir 152, through the correspondingly-located effluent outlet 131, though in practice such effluent is mixed in with liquid medium L.

Figure 2A:
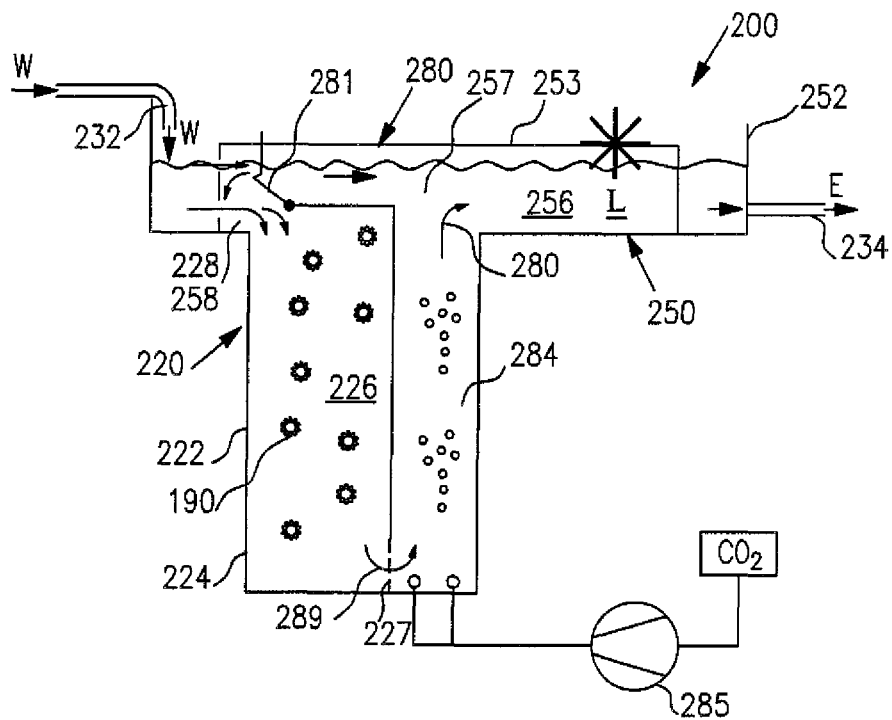
FIG. 2(a) and FIG. 2(b) are respectively a cross-sectional side view and a plan view of a system for aerobic processing of waste according to a second example of the presently disclosed subject matter.
Figure 2B:
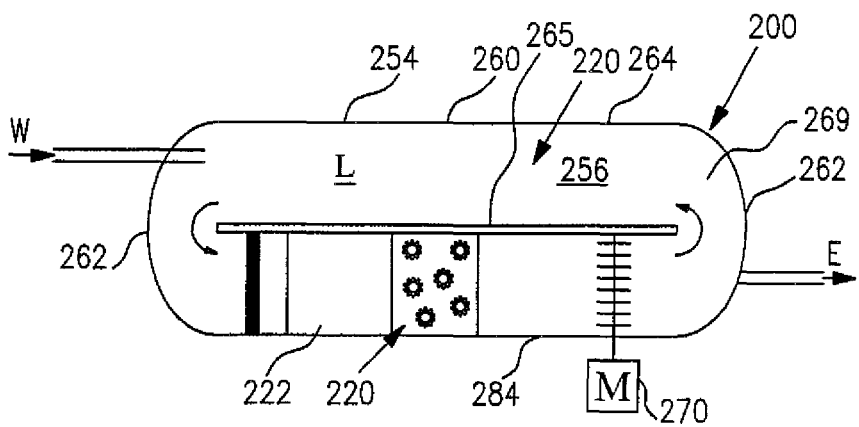

Referring to FIGS. 2(a) and 2(b), a second example of the system, generally designated 200, comprises the elements and features of system 100 of the first example and operates in a similar manner thereto, mutatis mutandis, but with some differences, as will become clearer herein. Thus, system 200 comprises aerobic bioreactor 220 and an oxygen-rich liquid medium source 250, similar to aerobic bioreactor 120 and oxygen-rich liquid medium source 150, mutatis mutandis, but with some differences.

Liquid medium source 250 comprises reservoir 252 (similar to reservoir 152, mutatis mutandis) and is configured for providing a supply of liquid medium L that is controllably recirculated between the reservoir 252 and the aerobic bioreactor 220. Liquid medium source 250 is different from and separate from the aerobic bioreactor 220.

The reservoir 252 similarly comprises walls 254 and defines an internal volume 256, different from and separate from the internal volume 226 of the aerobic bioreactor 220. While in alternative variations of this example the reservoir 252 can have any suitable shape, in this example the reservoir has a classical "raceway" configuration, similar to the reservoir 152 of the first example, mutatis mutandis, comprising a generally elongated rectangular planform 260, including generally rectilinear upstanding longitudinal walls 264, rounded ends 262, dividing wall 265, endless oval-shaped horizontal channel 269 allowing endless flow of the liquid medium L around the channel 269, driven by driver 270, respectively similar in form and function to: planform 160, generally rectilinear upstanding longitudinal walls 164, rounded ends 162, dividing wall 165, endless oval-shaped horizontal channel 169 and driver 170, mutatis mutandis. As with the first example, mutatis mutandis, the reservoir 252 is configured for allowing the internal volume 256 to be irradiated by said light, i.e. by electromagnetic radiation at least of the aforesaid predetermined group and/or range of wavelengths, and in the second example the reservoir 252 also has an open top 253, which optionally, can be covered with a translucent or transparent cover, allowing light to penetrate, but preventing contaminants from entering, the internal volume 256.

Aerobic bioreactor 220 comprises a vessel 222 and is configured for aerobically processing waste therein using suitable microorganisms and oxygen, in a similar manner to aerobic reactor 120 and vessel 122, mutatis mutandis, but with some differences, as will become clearer herein. This oxygen is provided via a supply of oxygen-rich liquid medium L that is controllably recirculated between the liquid medium source 250 and the aerobic bioreactor 220.

Vessel 222 comprises walls 224 and defines an internal volume 226. Vessel 222 can have any desired or suitable shape, and is configured for preventing the internal volume 226 from being irradiated by said light, and comprises microorganisms fixed in media 190, in a similar manner as disclosed herein for vessel 122 and media 190 of the first example, mutatis mutandis.

In the second example, vessel 222 located beneath the reservoir 252 and both components can optionally be constructed as an integral structure, or as two separate structures joined together.

In the second example, the respective recirculation circuit 280 is also configured for recirculating the liquid medium L between the aerobic bioreactor 220 and the reservoir 250, in particular between the internal volume 226 and the internal volume 256. The recirculation circuit 280 also has a reservoir outward flow path and a reservoir return flow path, but differs from the recirculation circuit 180 of the first example as follows. The reservoir outward flow path to the aerobic bioreactor 220 is via bioreactor inlet 228 which also acts as the reservoir outlet 258, while the reservoir return flow path is via conduit 284 that connects bioreactor outlet 227 with reservoir inlet 257.

The bioreactor inlet 228/reservoir outlet 258 is located at an upper portion of the vessel 222, and also located in the channel 269 and submerged within the liquid medium L therein at least during operation of the system 200. The recirculation circuit 280 further includes a valve arrangement 281 for selectively controlling what proportion of the flow of liquid medium L around the circuit 269 is diverted to the aerobic bioreactor 220. In the illustrated example, the valve arrangement 281 is in the form of a movable weir, pivotably mounted at the bioreactor inlet 228/reservoir outlet 258 and operates to pivot about the respective pivot axis to change the effective inlet area of the bioreactor inlet 228/reservoir outlet 258.

The bioreactor outlet 227 is located at a lower portion of the vessel 222, while reservoir inlet 257 opens into the channel 269 and submerged within the liquid medium L therein at least during operation of the system 200.

In this example, the free-floating media 190 are also prevented from leaving the aerobic bioreactor 220 and from being transported via recirculation circuit 280 to the reservoir 252, at least during operation of the system 200. For this purpose the aerobic bioreactor 220 comprises suitable mechanical filters or screens 289 at the bioreactor outlet 227, and optionally also at the bioreactor inlet 228/reservoir outlet 258 (not shown), that prevent passage of the media 190 therethrough, while allowing flow of the liquid medium L therethrough. Alternatively, free-floating media 190 can be replaced with fixed media as in the first example of system 100, mutatis mutandis and no such filters or screens are necessary and can be omitted.

In this example, the recirculation circuit 280 further comprises a pump 285 for driving the aforesaid recirculation of the liquid medium L between the aerobic bioreactor 220 and the reservoir 252. In the illustrated example, such a pump 285 is in the form of an airlift pump, powered by a blower, and located at the bottom end of the conduit 284. Such an airlift pump may comprise, for example, one or more of the following: Robox provided by Robuschi of Italy, or Delta Blower provided by Aerzen, of the USA; or Roots Blowers provided by GE of the USA. Optionally, the air introduced into the conduit 284 by the airlift pump can be enriched in $CO_2$, or can be replaced with $CO_2$, which can enhance growth of the algae in the reservoir 252 and generation of oxygen. In alternative variations of this example, pump 285 can have any other suitable form, for example similar to pump 185 as disclosed above for the first example, mutatis mutandis.

System 200 also comprises a waste inlet 232 and a processed effluent outlet 234, which in this example are provided in the reservoir 252 but in other alternative variations of this example can be provided directly to reservoir 220 instead.

Operation of the system 200 in CFM or in BM is as disclosed above for the first example of system 100 optionally including preprocessing and/or post-processing, mutatis mutandis, with the main difference being that the respective flow rate T2 of recirculating flow of liquid medium L between the reservoir 252 and the aerobic bioreactor 220 via recirculation circuit 280, is controlled by the flow rate of the liquid medium L around the channel 269 coupled with the effective flow area at the bioreactor inlet 228/reservoir outlet 258, which is controlled by the valve arrangement 281 and by the flow of air from pump 285.

Figure 3A:
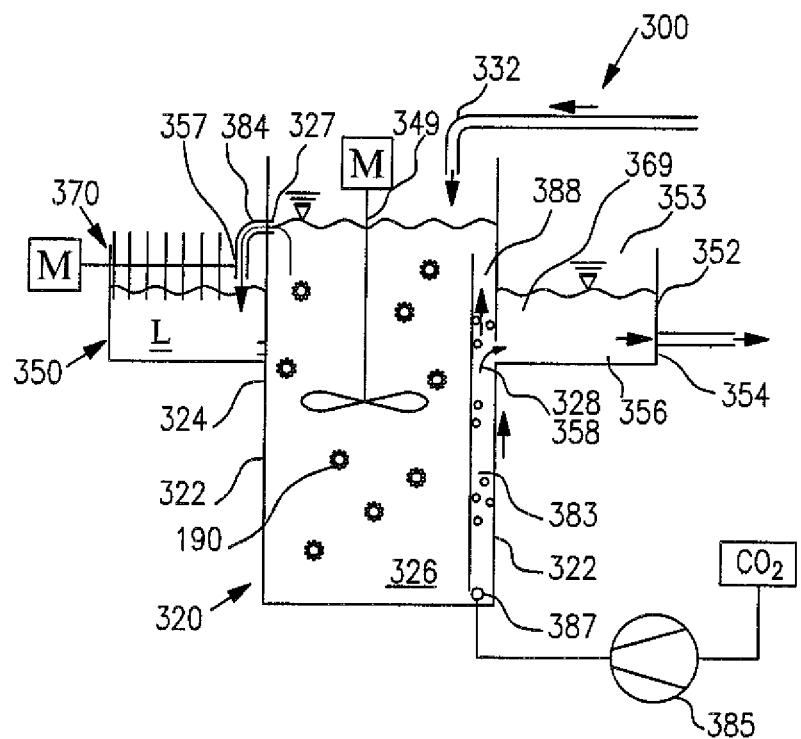
FIG. 3(a) and FIG. 3(b) are respectively a cross-sectional side view and a plan view of a system for aerobic processing of waste according to a third example of the presently disclosed subject matter.
Figure 3B:
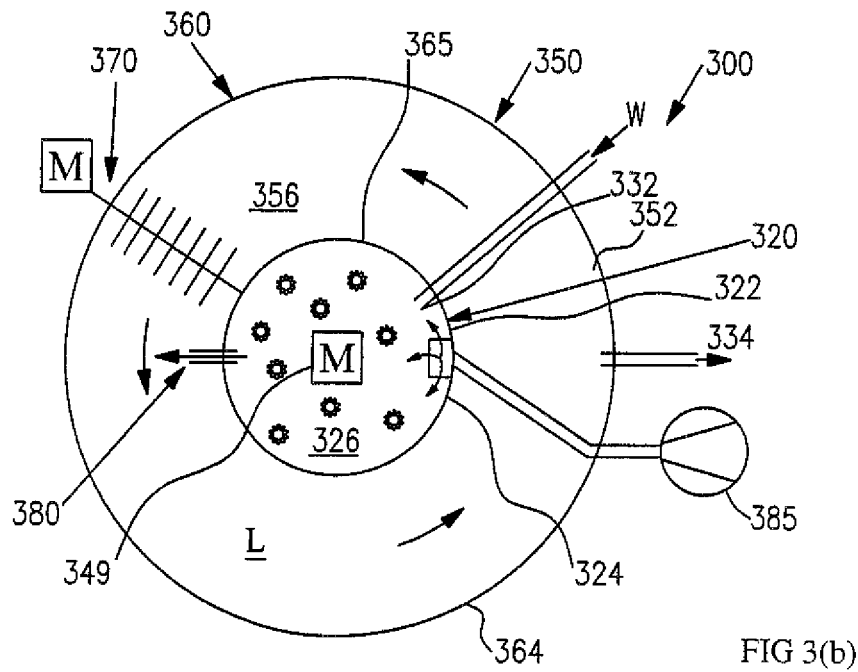

Referring to FIGS. 3(*a*) and 3(*b*), a third example of the system, generally designated 300, comprises the elements and features of system 100 of the first example (or similarly of system 200 of the second example) and operates in a similar manner thereto, mutatis mutandis, but with some differences, as will become clearer herein. Thus, system 300 comprises aerobic bioreactor 320 and an oxygen-rich liquid medium source 350, similar to aerobic bioreactor 120 and oxygen-rich liquid medium source 150, mutatis mutandis, but with some differences.

Liquid medium source 350 comprises reservoir 352, which similarly to reservoir 152, mutatis mutandis, is configured for providing a supply of liquid medium L that is controllably recirculated between the reservoir 352 and the aerobic bioreactor 320, and is different from and separate from the aerobic bioreactor 320.

The reservoir 352 similarly comprises walls 354 and defines an internal volume 356, different from and separate from the internal volume 326 of the aerobic bioreactor 320. While in alternative variations of this example the reservoir 352 can have any suitable shape, in this example the reservoir has a modified "raceway" configuration, similar to the reservoir 152 of the first example, mutatis mutandis, but in which the dividing wall 165 is replaced with a cylindrical wall 365. Thus, reservoir 352 comprises a generally annular planform 360, including generally cylindrical upstanding outer wall 364, and the inner said cylindrical wall 365, defining an endless annular-shaped horizontal channel 369 allowing endless flow of the liquid medium L around the channel 369, driven by driver 370, the channel 369 and driver 370 being respectively similar in form and/or function to endless oval-shaped horizontal channel 169 and driver 170, mutatis mutandis. As with the first example, mutatis mutandis, the reservoir 352 is configured for allowing the internal volume 356 to be irradiated by said light, i.e. by electromagnetic radiation at least of the aforesaid predetermined group and/or range of wavelengths, and in the third example the reservoir 352 also has an open top 353, which optionally, can be covered with a translucent or transparent cover, allowing light to penetrate, but preventing contaminants from entering, the internal volume 356.

Aerobic bioreactor 320 comprises a vessel 322 and is configured for aerobically processing waste therein using suitable microorganisms and oxygen, in a similar manner to aerobic reactor 120 and vessel 122, mutatis mutandis, but with some differences, as will become clearer herein. This oxygen is provided via a supply of oxygen-rich liquid medium L that is controllably recirculated between the liquid medium source 350 and the aerobic bioreactor 320.

Vessel 322 comprises walls 324 and defines an internal volume 326. Vessel 322 can have any desired or suitable shape, is configured for preventing the internal volume 326 from being irradiated by said light, and comprises microorganisms fixed in media 190, in a similar manner as disclosed herein for vessel 122 and media 190 of the first example, mutatis mutandis.

In the third example, vessel 322 located within the inner wall 365 and extends to a depth below that of the reservoir 352, and both components can optionally be constructed as an integral structure, or as two separate structures joined together. In particular, the outer cylindrical walls 324 of vessel 322 can act as inner cylindrical wall 365. Alternatively, in alternative variations of this example, the vessel 322 can be spaced from inner cylindrical wall 365 by a gap. For example, the vessel 322 can have a depth of between about 1 m and about 10 m.

In the third example, the respective recirculation circuit 380 is also configured for recirculating the liquid medium L between the aerobic bioreactor 320 and the reservoir 350, in particular between the internal volume 326 and the internal volume 356. The recirculation circuit 380 also has a reservoir outward flow path and a reservoir return flow path, but differs from the recirculation circuit 180 of the first example as follows.

The reservoir outward flow path to the aerobic bioreactor 320 is via bioreactor inlet 328 which also acts as the reservoir outlet 358, while the reservoir return flow path is via conduit 384 that connects bioreactor outlet 327 with reservoir inlet 357.

The bioreactor inlet 328/reservoir outlet 358 is located at an upper portion of the vessel 322, and also located in the channel 369 and submerged within the liquid medium L therein at least during operation of the system 300. The bioreactor inlet 328/reservoir outlet 358 opens into a conduit 383 within vessel 322, having an upper opening 388 and a lower opening 387 within internal volume 326.

The bioreactor outlet 327 is located at an upper portion of the vessel 322, well above the level of liquid medium L in the channel 369, and the reservoir inlet 357 is also located above the reservoir 352, and liquid flows along the reservoir return flow path from the aerobic bioreactor 320 to the reservoir 352 when the level of liquid in the aerobic bioreactor 320 tries to exceed the level of the bioreactor outlet 327. In alternative variations of this example, the bioreactor outlet 327 and/or the reservoir inlet 357 can be located elsewhere in the system 300, for example the reservoir inlet 357 can be located in the channel 369 and submerged within the liquid medium L therein at least during operation of the system 300.

In this example, the recirculation circuit 380 further comprises a pump 385 for driving the aforesaid recirculation of the liquid medium L between the aerobic bioreactor 320 and the reservoir 352. In the illustrated example, such a pump 385 is in the form of an airlift pump, powered by a compressor, and located at the bottom end of the conduit 383, near lower opening 387. Such an airlift pump may comprise, for example, any one of; Robox provided by Robuschi of Italy; or Delta Blower provided by Aerzen, of the USA; or Roots Blowers, provided by GE of the USA. As a gas such as air is introduced into conduit 383, an upward flow is induced in conduit 383, drawing in fluid from internal volume 326, which in turn acts as a venture at the bioreactor inlet 328/reservoir outlet 358 to draw in liquid medium from the channel 369. Thus, pump 385 is located close to the bioreactor inlet 328/reservoir outlet 358.

Optionally, the air introduced into the conduit 383 by the airlift pump can be enriched in $CO_2$, or can be replaced with $CO_2$, which can enhance growth of the algae in the reservoir 352 and generation of oxygen. In alternative variations of this example, pump 285 can have any other suitable form, for example similar to pump 185 as disclosed above for the first example, mutatis mutandis. In operation of the system 300, the $CO_2$ is entrained and dissolved in the liquid in the aerobic reactor 320, and subsequently flows out the aerobic reactor 320 and into the reservoir 352 together with this liquid. In alternative variations of this example, the pump 385 can be located at bioreactor outlet 327 instead of close to the bioreactor inlet 328/reservoir outlet 358, mutatis mutandis, thereby increasing efficiency of the $CO_2$ usage; in such an example, the hydraulic relationship between the aerobic reactor 320 and the reservoir 352 can be changed, with the level of liquid of the aerobic reactor 320 being lower than the level of liquid in the reservoir 352 (in contrast, in the example illustrated in FIG. 3(a), the level of liquid of the aerobic reactor 320 is higher than the level of liquid in the reservoir 352).

In this example, the free-floating media 190 are also prevented from leaving the aerobic bioreactor 320 and from being transported via recirculation circuit 280 to the reservoir 352, at least during operation of the system 300. For this purpose the aerobic bioreactor 320 comprises suitable mechanical filters or screens (not shown) at the bioreactor outlet 327, and optionally also at the bioreactor inlet 328/reservoir outlet 358 (not shown), that prevent passage of the media 190 therethrough, while allowing flow of the liquid medium L therethrough. Alternatively, free-floating media 190 can be replaced with fixed media as in the first example of system 100, mutatis mutandis and no such filters or screens are necessary and can be omitted.

In this example, the aerobic bioreactor 320 further comprises a mixing device 349, similar to the mixing device 149 of the first example of system 100, and is configured for mixing the media 190 within the liquid environment Q in the vessel 322, while minimizing or preventing damage to the media 190. In this example, the mixing device comprises a powered stirrer, which can be for example any one of the following: submersible mixers POPR-I provided by Landia, of Sweden; or mixer RW-400 provided by ABS of Sweden; or mixer 4850 top entry mixer provided by Flygt, of Sweden.

System 300 also comprises a waste inlet 332, provided into the aerobic bioreactor 320, and a processed effluent outlet 334, which in this example is provided in the reservoir 352.

Operation of the system 300 in CFM or in BM is as disclosed above for the first example of system 100 or second example of system 200 optionally including preprocessing and/or post-processing, mutatis mutandis, with the main difference being that the respective flow rate T2 of recirculating flow of liquid medium L between the reservoir 352 and the aerobic bioreactor 320 via recirculation circuit 380, is controlled by the flow rate of the liquid medium L around the channel 369 coupled with the pumping action of pump 385, and providing a more compact layout.

Figure 4A:
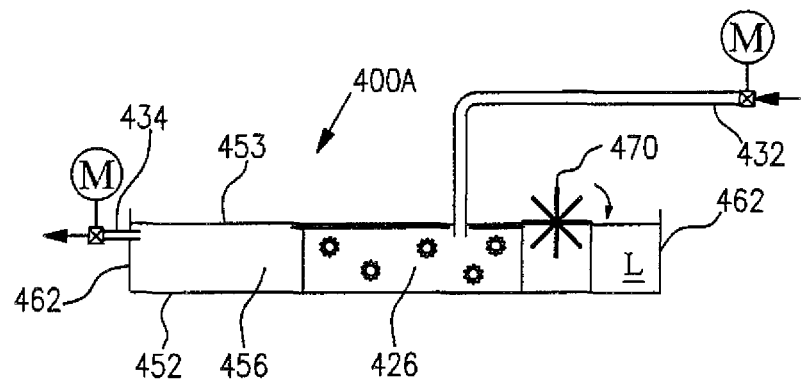
FIG. 4(a) and FIG. 4(b) are respectively a cross-sectional side view and a plan view of a system for aerobic processing of waste according to a fourth example of the presently disclosed subject matter.
Figure 4B:
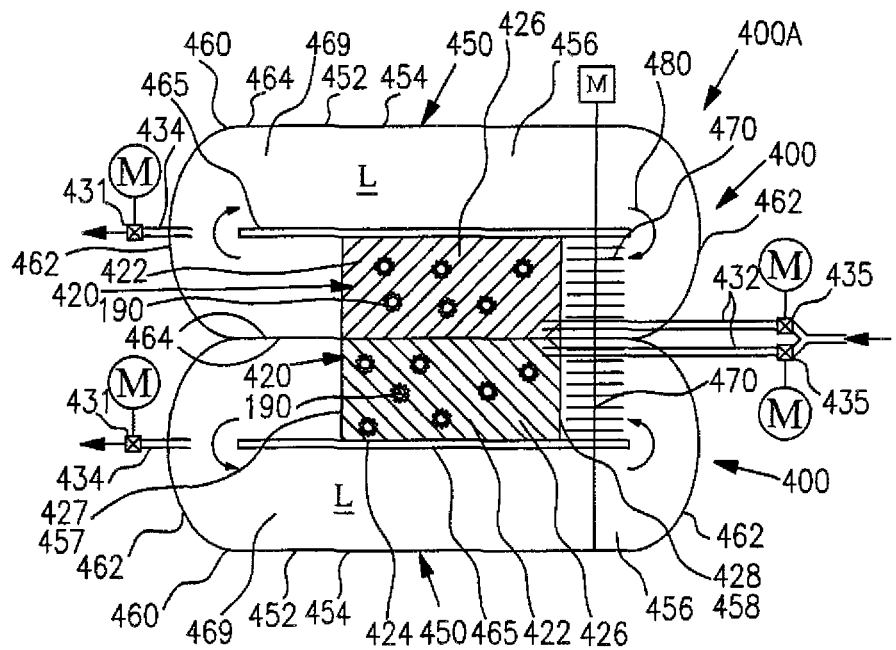

Referring to FIGS. 4(a) and 4(b), a fourth example of the system, generally designated 400A, comprises two self-contained systems 400 operating in parallel, though in other alternative variations of this example the system 400A can comprise only one system 400. In yet other alternative variations of this example the system 400A can comprise more than two systems 400, operating in parallel or in series, or two systems 400 operating in series.

Each system 400 comprises the elements and features of system 100 of the first example, and in particular of the system 200 of the second example and operates in a similar manner thereto, mutatis mutandis, but with some differences, as will become clearer herein. Each system 400 comprises an aerobic bioreactor 420 and an oxygen-rich liquid medium source 450, similar to aerobic bioreactor 120 and oxygen-rich liquid medium source 150, mutatis mutandis, but with some differences.

Liquid medium source 450 comprises reservoir 452 (similar to reservoir 152, mutatis mutandis, is configured for providing a supply of liquid medium L that is controllably recirculated between the reservoir 452 and the aerobic bioreactor 420, and is different from and separate from the aerobic bioreactor 220.

The reservoir 452 similarly comprises walls 454 and defines an internal volume 456, different from and separate from the internal volume 426 of the aerobic bioreactor 420. While in alternative variations of this example the reservoir 252 can have any suitable shape, in this example the reservoir also has a classical "raceway" configuration, similar to the reservoir 152 of the first example, mutatis mutandis, comprising a generally elongated rectangular planform 460, including generally rectilinear upstanding longitudinal walls 464, rounded ends 462, dividing wall 465, endless oval-shaped horizontal channel 469 allowing endless flow of the liquid medium L around the channel 469, driven by driver 470, respectively similar in form and function to: planform 160, generally rectilinear upstanding longitudinal walls 164, rounded ends 162, dividing wall 165, endless oval-shaped horizontal channel 169 and driver 170, mutatis mutandis. As with the first example, mutatis mutandis, the reservoir 452 is configured for allowing the internal volume 456 to be irradiated by said light, i.e. by electromagnetic radiation at least of the aforesaid predetermined group and/or range of wavelengths, and in the second example the reservoir 452 also has an open top 453, which optionally, can be covered with a translucent or transparent cover, allowing light to penetrate, but preventing contaminants from entering, the internal volume 456.

Aerobic bioreactor 420 comprises a vessel 422 and is configured for aerobically processing waste therein using suitable microorganisms and oxygen, in a similar manner to aerobic reactor 120 and vessel 122, mutatis mutandis, but with some differences, as will become clearer herein. This oxygen is provided via a supply of oxygen-rich liquid medium L that is controllably recirculated between the liquid medium source 450 and the aerobic bioreactor 420.

Vessel 422 comprises walls 424 and defines an internal volume 426. Vessel 422 can have any desired or suitable shape, and is configured for preventing the internal volume 426 from being irradiated by said light, and comprises microorganisms fixed in media 190, in a similar manner as disclosed herein for vessel 122 and media 190 of the first example, mutatis mutandis. Optionally, walls 424 can in fact be parts of the walls 454 of the reservoir 452.

In the fourth example, vessel 422 is located within the reservoir 452, in particular vessel 422 is accommodated in the channel 469, and both components—vessel 422 and the reservoir 452—can optionally be constructed as an integral structure, or as two separate structures joined together.

In the fourth example, the respective recirculation circuit 480 is provided directly by the circulating flow in the channel 469, which directly recirculates the liquid medium L between the aerobic bioreactor 420 and the channel 469 in reservoir 452, in particular between the internal volume 426 and the internal volume 456. The recirculation circuit 480 also has a reservoir outward flow path and a reservoir return flow path, but differs from the recirculation circuit 180 of the first example as follows. The reservoir outward flow path to the aerobic bioreactor 420 is via bioreactor inlet 428 which is in open communication with the reservoir outlet 458 at the channel 469, while the reservoir return flow path is via bioreactor outlet 427 which is in open communication with the reservoir inlet 457 at the channel 469. Thus, as liquid medium L is forced around the channel 469 using driver 470, it is also passed through the aerobic bioreactor 420, and no additional pump is required for the recirculation circuit 480.

In this example, the free-floating media 190 are also prevented from leaving the aerobic bioreactor 420 and from being transported via recirculation circuit 480 to the reservoir 452, at least during operation of the system 400. For this purpose the aerobic bioreactor 420 comprises suitable mechanical filters or screens 489 at the bioreactor outlet 427 and also at the bioreactor inlet 428, that prevent passage of the media 190 therethrough, while allowing flow of the liquid medium L therethrough. Alternatively, free-floating media 190 can be replaced with fixed media as in the first example of system 100, mutatis mutandis and no such filters or screens are necessary and can be omitted.

System 400 also comprises a waste inlet 432 opening directly into the aerobic bioreactor 420, and controllable via valve 435, and a processed effluent outlet 434, which in this example is provided in the reservoir 452, and is controllable via valve 431. For example, valves 435 and 431 can be motorized valves, the operation of which is controlled manually and/or via an automated controller, for example electronic control, computer control, hydraulic control, and so on.

Operation of the system 400 in BM is as disclosed above for the first example of system 100 optionally including preprocessing and/or post-processing, mutatis mutandis, with the main difference being that the respective flow rate T2 of recirculating flow of liquid medium L between the reservoir 452 and the aerobic bioreactor 420, is controlled by the flow rate of the liquid medium L around the channel 469.

In yet other alternative variations of the above first, second, third, or fourth examples, and alternative variations thereof, the algae is replaced with any other photosynthetic eukaryotic microorganisms or photosynthetic prokaryotic microorganisms, mutatis mutandis, for example as listed above.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A system for aerobically processing waste, comprising:
   an aerobic bioreactor configured for aerobically processing waste via bacteria fixed on media to provide processed effluent from the waste;
   a source of oxygen-rich liquid medium, comprising photosynthetic microorganisms that generate oxygen in said liquid medium responsive to exposure to light, said source being different from said aerobic bioreactor, said source being in selective fluid communication with said aerobic bioreactor;
   wherein said media is mobile within the bioreactor.

2. The system according to claim 1, comprising a recirculation circuit configured for controllably recirculating said liquid medium between said aerobic bioreactor and said source.

3. The system according to claim 1, wherein said system is configured for preventing the media from being transferred from the aerobic bioreactor to said source.

4. The system according to claim 1, wherein said media is restricted to a confined volume within said aerobic bioreactor.

5. The system according to claim 1, wherein in operation of the system a flow of said oxygen-rich liquid medium is forced through said confined volume to interact with said bacteria.

6. The system according to claim 1, wherein said source comprises at least one of:
   any one of photosynthetic eukaryotic microorganisms and photosynthetic prokaryotic microorganisms that generate oxygen to said liquid medium responsive to exposure to light; or
   algae that generate oxygen to said liquid medium responsive to exposure to light.

7. The system according to claim 1, wherein said source comprises a reservoir comprising a channel therein defining a reservoir internal volume, and configured for driving said liquid medium around said channel in operation of the system.

8. The system according to claim 1, wherein said media comprise biofilm carrier elements, in the form of solid inert substrates having a surface area to volume ratio between about 500 $m^2/m^3$ and about 1300 $m^2/m^3$.

9. The system according to claim 1, comprising a waste inlet configured for receiving the waste and a dispensing outlet for dispensing treated effluent, and wherein
   said bioreactor comprises at least one vessel defining a respective aerobic processing volume, the at least one vessel comprising a bioreactor fluid medium inlet and a bioreactor fluid medium outlet, each in selective fluid communication with said source, the at least one vessel being configured for ensuring that the respective aerobic processing volume is partially or fully shielded from light at least during operation of the the at least one vessel;
   said source comprises at least one reservoir defining a respective reservoir volume for accommodating a volume of said liquid medium, and further comprising a source fluid medium inlet and a source fluid medium outlet, each in selective fluid communication with said aerobic bioreactor, and a driving device for providing motion to said liquid medium within said respective reservoir volume, the at least one reservoir being configured for ensuring that the respective reservoir volume is exposed to light at least during operation of said source wherein to provide said oxygen-rich liquid medium.

10. The system according to claim 9, wherein said driving device comprises a powered paddling device mounted to the respective said reservoir.

11. The system according to claim 9, wherein said at least one reservoir comprises at least one flow channel in the form of a horizontal endless loop.

12. The system according to claim 9, wherein said source fluid medium outlet is configured for preventing flow of said media through said source fluid medium outlet.

13. The system according to claim 9, comprising:
at least one set of conduits providing said fluid communication between said at least one said vessel and a respective said reservoir;
a pumping system, different from said driving device, for providing recirculation of said medium between said at least one vessel and the respective said reservoir through said set of conduits.

14. The system according to claim 13, wherein one said conduit connects said source fluid medium inlet with said bioreactor fluid medium outlet and wherein another said conduit connects said source fluid medium outlet with said bioreactor fluid medium inlet.

15. A method for aerobically processing waste, comprising:
reacting waste aerobically with bacteria in a bioreactor volume under conditions configured for inhibiting or reducing growth of photosynthetic microorganisms, wherein said bacteria are fixed on media, and said media is mobile within the bioreactor volume;
providing a flow of oxygen-producing photosynthetic microorganisms through the bioreactor volume from a source configured for promoting oxygen production by photosynthetic microorganisms, the source being different from the bioreactor volume, the photosynthetic microorganisms generating and providing oxygen to said liquid medium responsive to exposure to light;
exposing said photosynthetic microorganisms to light in said source prior to said photosynthetic microorganisms being caused to flow through the bioreactor volume, to thereby generate and provide said oxygen to said liquid medium; and
preventing at least a majority of the bacteria from exiting the bioreactor with said flow of photosynthetic microorganisms.

16. The method according to claim 15, wherein said photosynthetic microorganisms comprise any one of photosynthetic eukaryotic microorganisms and photosynthetic prokaryotic microorganisms that generate oxygen in said liquid medium responsive to exposure to light.

17. The method according to claim 15, wherein said source comprises algae that generate oxygen in said liquid medium responsive to exposure to light.

18. The method according to claim 15, wherein said photosynthetic microorganisms comprise at least one of: *Chlorella* spp., spirulina, scendesmus, cyanobacteria.

19. A system for aerobically processing waste, comprising:
an aerobic bioreactor configured for aerobically processing waste to provide processed effluent from the waste using bacteria being fixed on media;
a source of oxygen-rich liquid medium, said source being different from the bioreactor, said liquid medium comprising photosynthetic microorganisms that generate oxygen in said liquid medium responsive to exposure to light;
a recirculation circuit configured for controllably recirculating said liquid medium between said aerobic bioreactor and said source;
wherein said media is mobile within the bioreactor.

* * * * *